(12) United States Patent
AlYousif et al.

(10) Patent No.: US 11,441,069 B2
(45) Date of Patent: Sep. 13, 2022

(54) METHOD FOR IMPROVING AQUIFER REMEDIATION USING IN-SITU GENERATED NITROGEN FOAM

(71) Applicant: SAUDI ARABIAN OIL COMPANY, Dhahran (SA)

(72) Inventors: Zuhair AlYousif, Saihat (SA); Ali Abdullah Al-Taq, Qatif (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 146 days.

(21) Appl. No.: 16/937,959

(22) Filed: Jul. 24, 2020

(65) Prior Publication Data
US 2022/0025252 A1  Jan. 27, 2022

(51) Int. Cl.
*C09K 8/94* (2006.01)
*C08J 9/10* (2006.01)

(52) U.S. Cl.
CPC ........... *C09K 8/94* (2013.01); *C08J 9/10* (2013.01); *C08J 2203/04* (2013.01); *C08J 2207/12* (2013.01)

(58) Field of Classification Search
CPC ... C09K 8/92; C09K 8/94; C09K 8/70; C09K 8/703; C09K 8/518; C09K 8/516; C08J 2203/04
See application file for complete search history.

(56) References Cited

U.S. PATENT DOCUMENTS

| | | | |
|---|---|---|---|
| 3,273,643 A * | 9/1966 | Billings et al. | C09K 8/94 175/69 |
| 3,893,511 A * | 7/1975 | Root | E21B 43/18 166/305.1 |
| 4,219,083 A | 8/1980 | Richardson et al. | |
| 4,232,741 A * | 11/1980 | Richardson | E21B 43/261 166/305.1 |
| 4,846,277 A | 7/1989 | Khalil et al. | |
| 5,405,509 A | 4/1995 | Lomasney et al. | |
| 5,780,395 A | 7/1998 | Sydansk | |
| 6,210,955 B1 * | 4/2001 | Hayes | B09C 1/10 516/18 |
| 6,379,083 B1 | 4/2002 | Maeda | |

(Continued)

FOREIGN PATENT DOCUMENTS

| CN | 1927993 A | 3/2007 |
|---|---|---|
| CN | 101323780 A | 12/2008 |

(Continued)

OTHER PUBLICATIONS

International Search Report and Written Opinion issued in corresponding International Application No. PCT/US2020/052602, dated Apr. 16, 2021 (12 pages).

(Continued)

*Primary Examiner* — Angela M DiTrani Leff
(74) *Attorney, Agent, or Firm* — Osha Bergman Watanabe & Burton LLP

(57) ABSTRACT

A method of remediation of a water-bearing formation is disclosed. A first solution containing a nitrogen-containing compound and a second solution containing a nitrite-containing compound are introduced into the water-bearing formation. The two solutions intermix within the formation such that a foam is generated within the formation.

17 Claims, 4 Drawing Sheets

(56) References Cited

U.S. PATENT DOCUMENTS

| | | | |
|---|---|---|---|
| 6,602,024 B1 | 8/2003 | Valsaraj et al. | |
| 6,827,861 B2 | 12/2004 | Kerfoot | |
| 7,300,227 B2 | 11/2007 | Li et al. | |
| 7,642,223 B2 * | 1/2010 | Santra | E21B 33/138 507/221 |
| 2010/0209195 A1 | 8/2010 | Shiau | |
| 2015/0014221 A1 | 1/2015 | Yoon | |
| 2015/0361328 A1 * | 12/2015 | Almutairi | E21B 43/24 166/300 |
| 2016/0244661 A1 | 8/2016 | Almubarak et al. | |
| 2016/0319182 A1 * | 11/2016 | Al-Nakhli | C09K 8/528 |
| 2018/0274348 A1 | 9/2018 | Karale et al. | |

FOREIGN PATENT DOCUMENTS

| | | | |
|---|---|---|---|
| CN | 103484127 A | 1/2014 | |
| CN | 108130067 A | 6/2018 | |
| CN | 109281643 A | 1/2019 | |
| CN | 110272726 A | 9/2019 | |
| JP | 3215102 B2 | 10/2001 | |
| RU | 2236575 C2 | 9/2004 | |
| RU | 2250364 C2 | 4/2005 | |
| WO | 2000063127 A1 | 10/2000 | |
| WO | WO-2014149524 A1 * | 9/2014 | C09K 8/38 |

OTHER PUBLICATIONS

Richter, W., "Experiences in Oil and Gas Exploration and Exploitation with Regard to Groundwater Contamination and Groundwater Protection", Scientific and Technical Aspects of Air and Water Conservation, WPC-12828, World Petroleum Congress, Apr. 1967, pp. 285-288 (4 pages).

* cited by examiner

METHOD FOR IMPROVING AQUIFER REMEDIATION USING IN-SITU GENERATED NITROGEN FOAM

BACKGROUND

The accumulation of DNAPL (Dense Non-Aqueous Phase Liquid) in an aquifer is a persistent source of contamination that cannot be remediated by the traditional method of pumping chemicals into a water-bearing formation. The injected chemicals, usually surfactants, have been used widely as a remediation technology to remove groundwater contaminants, such as petroleum hydrocarbons and chlorocarbons. Surfactant solutions are useful for treating the lower portion of the water-bearing formation due to "underride" as well as potions of the formation with greater areas of permeability; however, this leaves two areas under or not treated: the upper portion of the water-bearing formation and the reduced permeability zones. Gravity underride and the presence of heterogeneity in the porous media may result in a poor volumetric sweep efficiency and, therefore, incompletely treating the aquifer.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to a method of remediation of a water-bearing formation. A first solution and a second solution are introduced into the water-bearing formation. The two solutions intermix within the formation. The intermixed solution is maintained in the formation such that a foam is generated in the formation, that is, in situ. The intermixed solution includes a foaming agent. The first aqueous solution includes a nitrogen-containing compound. The second aqueous solution comprises a nitrite-containing compound.

In some embodiments, the nitrogen-containing compound is selected from the group consisting ammonium-containing compounds, primary amine-containing compounds, and combinations thereof. Ammonium-containing compounds include, but are not limited to, ammonium hydroxide, ammonium chloride, ammonium bromide, ammonium nitrate, ammonium nitrite, ammonium acetate, ammonium formate, ammonium sulfate, and ammonium carbonate. Primary amine-containing compounds include, but are not limited to, ethylene diamine, formamide, acetamide, urea, benzyl urea, butyl urea, hydrazine, phenylhydrazine, and phenylhydrazine hydro-chloride.

In some embodiments, the nitrite-containing compound is selected from the group consisting of ammonium nitrite, calcium nitrite, sodium nitrite, potassium nitrate, and combinations thereof.

Other aspects and advantages of the claimed subject matter will be apparent from the following description and the appended claims.

BRIEF DESCRIPTION OF DRAWINGS

Like numbers refer to like elements throughout. The prime notation, if used, indicates similar elements in alternative embodiments.

DETAILED DESCRIPTION

Figure 1:
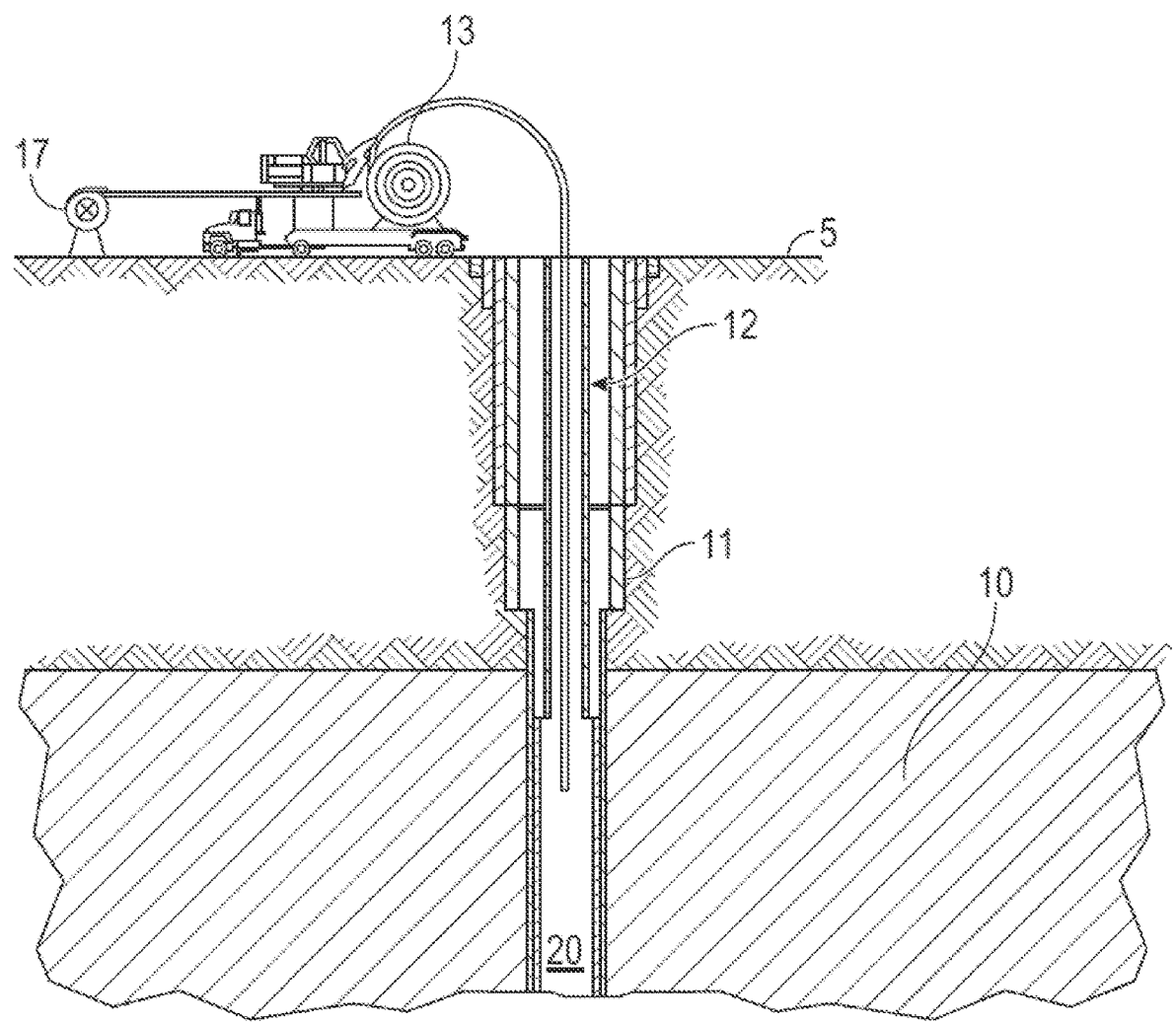
FIG. 1 depicts an apparatus employed in the practice of an embodiment of the present disclosure.

In one aspect, embodiments disclosed relate to a method for remediation of a water-bearing formation. In particular, embodiments disclosed relate to in situ foam generation that may allow for improved volumetric sweep efficiency for remediation of a water-bearing formation. Specifically, foam may be generated by in situ nitrogen gas generation in the presence of a foaming agent. There is a need for a method to effectively, quickly, and economically remediate subsurface systems that are contaminated with DNAPLs. Such a method is currently unavailable in the art.

It is well-understood that reservoir rocks are non-homogeneous, that is, formations bearing fluids are typically heterogeneous. The main cause of such heterogeneity is the depositional environment occurred thousands of years ago. Because of the heterogeneity of a formation, different properties within the same formation, including porosity and permeability, causes poor sweep efficiency of displaced fluids. Greater permeability and lower permeability streaks might exist at any place within the entire water-bearing formation. The permeability of such formation might be within few mD (millidarcy) to several Darcies. For example, it might be within hundreds mD to around 10 D or even higher.

As mentioned previously, because of such significant heterogeneity within the same formation, it is difficult to anticipate how the flow might occur. But it is well-known that most of the injected fluids will flow through the greater permeability zones and bypass the reduced permeability zones. Conformance control is needed to solve such issue.

Aqueous Solutions

The methods and composition described are responsible for the release of kinetic and thermal energies and the release of nitrogen gas as a result of the oxidation-reduction reaction between an nitrogen-containing compound and a nitrite-containing compound. In embodiments, a first solution comprising an nitrogen-containing compound is introduced into a water-bearing formation. A second solution comprising a nitrite-containing compound is introduced into the water-bearing formation. Both the first and the second solutions are introduced into the water-bearing formation such that they intermix within the formation.

It is understood that that the terms "ammonium-containing compound", "ammonium ions", "nitrite-containing compound" and "nitrite ions" as used refers to an ionic compound wherein a counter ion is included, for example, for an ammonium-containing compound the ammonium ions may be supplied as ammonium chloride.

In an embodiment, the first aqueous solution is a solution of ammonium chloride and the second aqueous solution is a solution of sodium nitrite. Upon addition of a proton donor such as an acid or application of heat, the reactants react and form nitrogen gas, sodium chloride, water, and heat. Equation 1 shows the balanced reaction between ammonium chloride and sodium nitrite:

$$NH_4Cl+NaNO_2 \rightarrow N_2(g)+NaCl+2H_2O+Heat \quad \text{(Equation 1)}$$

The reaction of Equation 1 releases approximately 75 kcal/mol (kilocalories per mole). The reaction requires the addition of acid or heat, such as latent heat of the water-bearing formation, to initiate the reaction. Each will be described in more detail following.

Although Equation 1 is shown using ammonium-chloride as an example of an nitrogen-containing compound, the scope of the disclosed technology is not so limited. Useful nitrogen-containing compounds are ones that react with nitrite-containing compounds to form nitrogen gas.

Nitrogen-containing compounds may include ammonium-containing compounds. Ammonium-containing compound can be selected from ammonium-bearing compounds ($NH_4^+$ ion), including but not limited to ammonium hydroxide, ammonium chloride, ammonium bromide, ammonium nitrate, ammonium nitrite, ammonium acetate, ammonium formate, ammonium sulfate, and ammonium carbonate. Combinations of one or more may be used as well.

Nitrogen-containing compounds may also include primary amine-containing compounds ($RNH_2$). Examples of primary amine-containing compounds include, but are not limited to, ethylene diamine, formamide, acetamide, urea, benzyl urea, butyl urea, hydrazine, phenylhydrazine, and phenylhydrazine hydro-chloride. Combinations of one or more may be used as well.

Combinations of an ammonium-containing compound and a primary amine-containing compound may be used together as the nitrogen-containing compound.

As well, useful nitrite-containing compounds are not merely limited to sodium nitrite but rather are ones that react with ammonium-containing compounds. Nitrite-containing compound can be selected from such compounds as ammonium nitrite, calcium nitrite, sodium nitrite, potassium nitrate, and combinations thereof. In using ammonium nitrite, the solution may need to be cooled before introduction due to its instability at temperatures greater than room temperature.

In certain embodiments, equal molar amounts of the nitrogen-containing compounds and the nitrite-containing compounds are introduced into the water-bearing formation to ensure complete reaction of both components. In alternate embodiments, up to about 5%, or up to about 10% excess, of either component can be employed. Thus, in certain embodiments, the ratio of nitrogen-containing compounds to nitrite-containing compounds in the solutions disclosed can range from between about 1.1:1 to 1:1.1; alternatively, between about 1.05:1 and 1:1.05, and alternatively about 1:1.

In some embodiments, the molar ratio of the nitrogen-containing compound in the first solution and the concentration of the nitrite-containing compound in the second solution is in a range of about 2.5:1 to about 1:2.5. In such instances, it may be desirable to push the reaction to quickly completion by providing a greater amount of one reactant over another. As well, if one reactant is non-toxic or has low toxicity, that reactant may be selected to be the majority reactant as any remainder will not be harmful if present in dilute amounts. The ratio of nitrogen-containing compound to nitrite-containing compound can be in a range of from about 1:2 to about 2:1, alternatively in a range of from about 1:1.5 to about 1.5:1, alternatively in a range of from about 1:1.25 to about 1.25:1, alternatively to about 1:1. In certain embodiments the ratio of nitrogen-containing compound to nitrite-containing compound can be in a range of from about 1:1 to about 2:1, alternatively in a range of from about 1:1 to about 1.5:1, alternatively about 1.25:1.

In some other embodiments, the volume of the first aqueous solution and the volume of the second aqueous solution are substantially equivalent. In such an embodiment, the volume ratio of the first solution to the second solution is about 1:1. In such instances, the molar concentrations of the nitrogen-containing compound and the nitrite-containing compound may vary to permit the volumes to be substantially equivalent. For example, the first solution may have a molarity of about 4 (4M) of a nitrogen-containing compound, such as an ammonium-containing compound, such as ammonium chloride, and the second solution may have a molarity that is about twice as much, for example, about 7 to about 8M, of nitrite-containing compound, such as sodium nitrite, while the volumes of each solution introduced are substantially equivalent. Using similar to equal volumes of the first and the second solution but at different molarities provides for ease of administration and monitoring of the introduction of the two fluids in the field. Similar pumps running the two fluids can introduce the solutions to the water-bearing formation at similar pumping rates.

Foam quality is measured by the percentage of gas trapped in the cells. The volume of the first and second solutions determines the foam quality. Foam in a porous media such as the water-bearing formation is a dispersion of gas in liquid such that the liquid phase is continuous and some part of the gas is discontinuous. Gas fractional flow in the foam flows through the porous media water-bearing formation is described as foam quality. A quality of 95% is considered the upper end of foam stability. Foams at a quality of 70% to 85% have effectively been used in reservoir formations to stimulate gas production. In some embodiments, the foam quality of the foam produced from the intermixed solution is in a range of from about 50% to about 99%, such as from about 55%, or from about 57%, or from about 59%, to about 95%, to about 97% to about 99%.

In embodiments of the method, a foaming agent is present. Nitrogen gas generated in situ the water-bearing formation in the presence of the foaming agent will form a viscous, low-density foam that will occupy the permeable spaces of the water-based formation. The foam forms with the foaming agent under the emerging gas from solution and the friction of the fluid within the water-bearing formation. In some embodiments, the foaming agent is introduced to the water-based formation as part of the first solution. In some embodiments, the foaming agent is introduced to the water-based formation as part of the second solution.

The type of foaming agent may be anionic, cationic, amphoteric (or zwitterionic), or nonionic, and combinations thereof. In various embodiments, the type of foaming agent used will depend on several factors, including the formation type (for example, carbonate, sandstone, shale due to the ability of a foaming agent to interact chemically or ionically with the formation material); temperature (some foaming agents are known to be less effective at greater temperatures); desired foam viscosity, which may depend on the porosity of the formation (foam is more resilient with greater pore size); desired foam strength (that is, half-life), and water salinity. In some embodiments, the type of foaming agent is amphoteric. In some such embodiments, the foaming agent comprises a combination of lauramidopropyl betaine and myristamidopropyl betaine, such as found in Amphosol® LB (Stepan Company; Northfield, Ill., USA).

The concentration of the foaming agent in the intermixed solution can range from greater than 0.0 wt. % (weight percent) to about 2 wt. % of the intermixed solution in the water-bearing formation. The impact upon the amount of foaming agent provided is both adsorption onto the surface of the formation (as previously described) and the cost of the foaming agents. Too little foaming agent results in an unstable foam; too much foaming agent results in a waste of material.

Optionally, the first solution also comprises an acid. The amount and type of acid used is any acid that is effective in reducing the pH of the intermixed solution in the water-bearing formation to a pH equal to or less than 4.5 upon intermixing. Acidic hydrogen atoms at a pH of between about 3 and 5 in the intermixed solution can initiate the reaction.

Any compound that may release an acidic hydrogen may be useful as an initiator of the reaction between the nitrogen-containing compound and the nitrite-containing compound. Examples of useful acids may include weak acids, such as citric acid, propionic acid, benzoic acid, formic acid, and acetic acid; strong acids, such as hydrochloric acid, and diluted strong acids. Diluted strong acids, such as diluted hydrochloric acid, can be used to activate the reaction with or without the addition of a buffer to control side-reactions with the formation material.

Optionally, an acid buffer may be included with a first solution such that the intermixed solution includes an acid buffer in the water-bearing formation. The buffer should be soluble and compatible with the nitrogen and nitrite containing compounds, and the resulting reaction products. Additionally, the buffer is configured to release acidic hydrogen ions at a rate that is sufficiently slow such that the intermixed solution is introduced into the water-bearing formation and positioned before the pH is reduced to a value of less than about 4.5. For example, in using a strong acid like HCl, it is common to use iron control agents like acetic acid and formic acid. In such embodiments, sodium acetate and sodium formate may be used, respectively, as acid buffers.

In embodiments of the first solution and the second solution, water is the solvent for the nitrogen-containing compound and the nitrite-containing compound, respectively. "Water" includes, but is not limited to, freshwater (water having relatively low (that is, less than 5000 ppm) concentrations of total dissolved solids), synthetic or natural seawater (for example, water having a salinity in the range of about 33,000 to about 37,000 ppm, synthetic brines, natural brines, brackish water, production water, formation water, and combinations thereof. For both the first and the second solutions, and the intermixed solutions, the remainder is comprised of water.

Method of Treatment of a Water-Bearing Formation

Upon mixing downhole and initiating the reaction between the nitrogen-containing compound and the nitrite-containing compound, both heat and nitrogen gas are generated. In the presence of the foaming agent and water, the heat and nitrogen gas cause a foam to form in the water-bearing formation. The shearing created by the formation of the nitrogen gas coming out of the intermixed solution and the pushing of the intermixed solution and the foam into the water-bearing formation creates more foam bubbles. The product foam expands outwardly from the point of reaction throughout the water-bearing formation.

FIG. 1 is a schematic representation of an embodiment method for treating a water-bearing formation. A water-bearing formation 10 is depicted having a wellbore wall 11 both extending downward from a surface 5 into the water-bearing formation 10 and defining a wellbore 20. Production tubing 12 and a coiled tubing 13 extend downwards through the wellbore 20 towards the water-bearing formation 10.

The first solution and the second solution are introduced both simultaneously and separately into the water-bearing formation. In an embodiment of the method, the first solution containing the nitrogen-containing compound is introduced into water-bearing formation 10 via a pump 17 through the coiled tubing 13. The second solution containing the nitrite-containing compound and the foaming agent are introduced through the production tubing 12. In an alternative embodiment, the first solution is introduced via a production tubing and the second solution is introduced via a production tubing, and both solutions are introduced simultaneously.

Figure 2A:
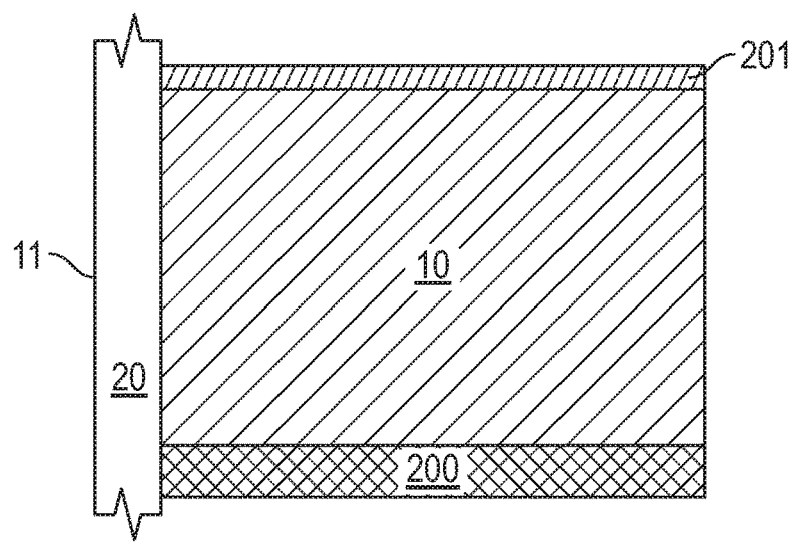
FIGS. 2A-E depict steps in an embodiment of the present disclosure.

FIGS. 2A-E and 3 show a more comprehensive version of several embodiments of treatment methods. In FIG. 2A, water-bearing formation 10 is between two non-permeable, non-water bearing formations 200 and 201. Wellbore wall 11 defines a wellbore 20 traversing the several formations 10, 200, and 201.

Figure 2B:
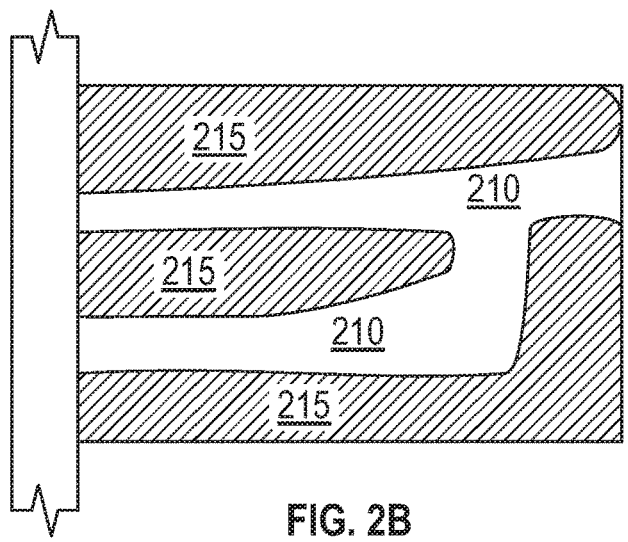

FIG. 2B shows that water-bearing formation 10 has areas of greater permeability 210 and areas of reduced permeability 215. Areas of greater permeability in some instances may naturally occur. In other instances, the areas of greater permeability may have been artificially created, such as matrix acidification. Areas of greater permeability 210 in some instances may have been previously treated with a treatment regimen that removed contaminated materials from the areas of greater permeability. In other instances, the areas of greater permeability may not have been previously treated.

Figure 2C:
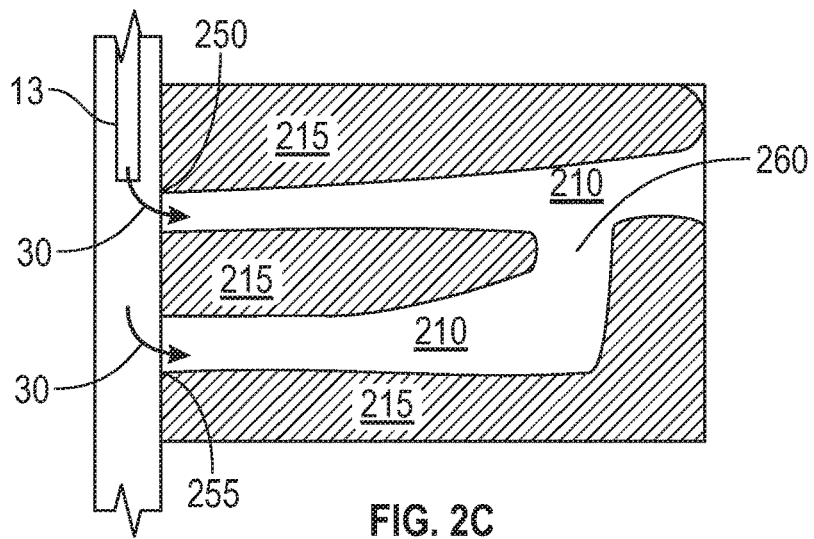

FIG. 2C shows the introduction (arrows 30) of the first and second solutions into the water-bearing formation 10 from wellbore 20 such that they intermix within the areas of greater permeability 210. Note the presence of the end of coiled tubing 13 proximate to the water-bearing formation 10 so as to prevent mixing of first and second solutions until they are present in the water-bearing formation 10.

In some embodiments, the first aqueous solution and the second aqueous solution are introduced into the formation separately and simultaneously. For example, as previously described, the first aqueous solution may be introduced into the formation using coiled tubing and the second aqueous solution may be introduced using the production tubing. In such an instance, the two solutions can be maintained separately until the moment of introduction into the formation, where they begin to intermix within the formation. The formation may have highly permeable entry points (for example, 250 and 255), for example, accessible from wellbore 20. In some such instances, intermixing may occur just within the face of the formation at the wellbore wall. For example, enough of both the first and second solutions may be present at entry point 250 into water-bearing formation 10 that intermixing occurs. In other instances, intermixing may occur along a fluid front within the formation where the first solution and the second solution meet. For example, a majority of the solution traversing the coil tubing may enter the formation at entry point (250) and a majority of the solution traversing the production tubing may enter the formation at a second entry point (255), and intermixing occurs much deeper within the formation 10, for example, at high permeability convergence point 260.

Figure 3:
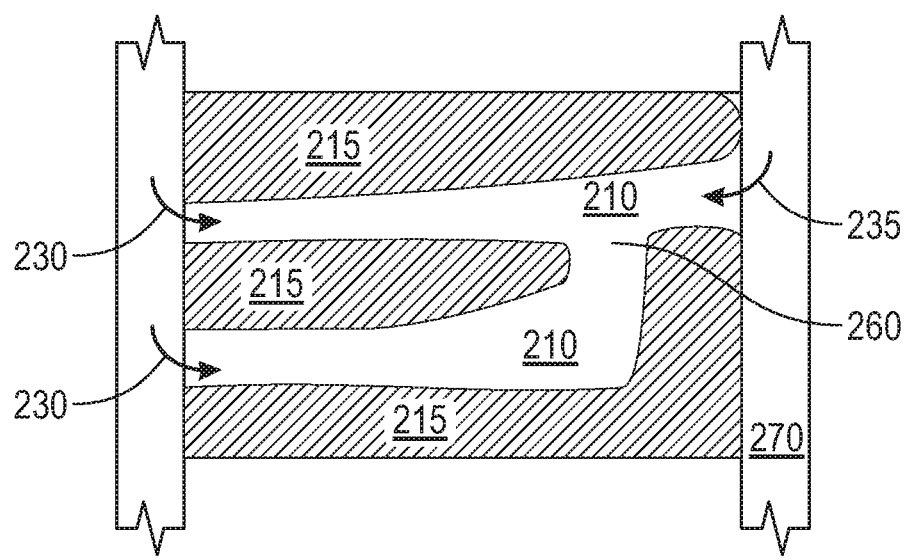
FIG. 3 depicts an alternative step for an embodiment of the present disclosure.

In some embodiments, the first solution and the second solution are introduced separately but not necessarily simultaneously. FIG. 3 shows the introduction (arrows 230) of the first solution into the water-bearing formation 10 from wellbore 20 and the introduction of the second solution (arrow 235) into the water-bearing formation 10 occurs from a second wellbore 270. In such an instance, the first and second solutions are introduced into different areas of greater permeability 210 and migrate towards one another from different directions such as at the high permeability convergence point 260. In such an instance, intermixing between the first and second solutions would occur at the fluid front between the two solutions within the water-bearing formation. In such instances, the solutions do not need to be introduced simultaneously as the first time the first solution and the second solutions can possibly meet are within the water-bearing formation; it is not feasible for the first solution and the second solution to interact otherwise as they are introduced through different wellbores. The first and second solutions intermix upon meeting within formation 10. In such an embodiment, the step of FIG. 3 would replace the step of FIG. 2C.

The intermixed solution is maintained in the formation until the foam is generated in situ from the reaction between the nitrogen-containing compound and the nitrite-containing compound in the presence of the foaming agent. At these formation conditions, in some embodiments, the reaction is initiated by the heat of the formation. Heat from elevated temperatures within the water-bearing formation (as compared to surface conditions) can cause the reaction between the ammonium-containing compound and the nitrite-containing compound to initiate. In certain embodiments, the temperature of the formation is at least about 60° C. and alternatively at least about 70° C. In certain embodiments, the temperature of the formation is in a range of from about 60° C. to about 110° C., such as from about 60° C., 62° C., or 64° C., to about 106° C., 108° C., and about 110° C., and all values, ranges and combinations thereof of a mathematically-feasible lower limit and upper limit. In some instances, overburden pressure or the composition of the water in the formation, such as a brine-like formation water, permits the temperature of the formation to be greater than 100° C., which on the surface is about the temperature of which fresh water boils.

The reaction of the intermixed solution can be delayed by introducing the first aqueous solution, the second aqueous solution, or both, into the formation at a temperature less than the temperature of the formation. In doing so, upon introduction of a relatively cooler solution into the formation, heat will flow from the relatively warmer formation into the cooler solution until either the solution is at ambient conditions of the formation or the foaming reaction is triggered in the intermixed solution, whichever comes first. For example, a solution of ammonium chloride, a nitrogen-containing compound, such as an ammonium-containing compound, is known to have a molar solubility in water of up to 5.49M at 0° C. and 7.16M at 25° C. As well, a solution of sodium nitrite, a nitrite-containing compound, is known to have a molar solubility in water of up to 10.20M at 0° C. and 12.29M at 25° C. These molar quantities at the reduced temperatures are sufficient to support the formation of the foam in situ. In addition, their solubility at reduced temperatures indicates that nitrogen-containing compounds and nitrite-containing compounds can be provided in sufficient quantities at the reduced introduction temperatures to create a reaction at greater formation temperatures.

In some embodiments, the temperature at which the first solution is introduced into the formation is less than the temperature of the formation. In some such embodiments, the temperature in which the first solution is introduced is greater than about 0° C. and less than about 60° C. In certain embodiments, the temperature of the first solution is in a range of from greater than 0° C. to less than 60° C., such as from greater than 0° C., 2° C., or 4° C., to about 56° C., 58° C., and less than 60° C., and all values, ranges and combinations thereof of a lower limit and an upper limit.

In some embodiments, the temperature at which the second solution is introduced into the formation is less than the temperature of the formation. In some such embodiments, the temperature in which the second solution is introduced is greater than about 0° C. and less than about 60° C. In certain embodiments, the temperature of the second solution is in a range of from greater than 0° C. to less than 60° C., such as from greater than 0° C., 2° C., or 4° C., to about 56° C., 58° C., and less than 60° C., and all values, ranges and combinations thereof of a lower limit and an upper limit.

In some instances, it may be useful to have the product foam to form instantly upon first solution and the second solution contacting each other and forming the intermixed solution. The reaction between the two solutions may occur immediately upon intermixing by introducing the first aqueous solution, the second aqueous solution, or both, into the formation at a temperature sufficient for the intermixed solution to be at or greater than about 60° C. In some embodiments, the temperature in which the first solution is introduced is greater than about 60° C. In some embodiments, the temperature in which the second solution is introduced is greater than about 60° C. In some embodiments, the temperature in which the first and the second solution are introduced are the same and is greater than about 60° C. In some embodiments, the temperature in which the first solution is introduced is such that the temperature of the intermixed solution in the water-bearing formation is greater than 60° C. In some embodiments, the temperature in which the second solution is introduced such that the temperature of the intermixed solution in the water-bearing formation is greater than 60° C.

In some other embodiments, the reaction is initiated by proton donation from an acid present in the intermixed solution. In some such embodiments, the concentration of acid in the first solution is such that the pH of the intermixed solution in the water-bearing formation is at or less than about 4.5. In certain embodiments, the pH of the intermixed solution in the water-bearing formation is in a range of from greater than about 0 to less than about 4.5, such as from greater than 0, 0.5, or 1, to about 3.5, 4.0 and less than 4.5, and all values, ranges and combinations thereof of a lower limit and an upper limit.

In some embodiments, the intermixed solution is maintained at a pressure greater than the formation pressure during in-situ foam generation such that the foam traverses into the greater permeability area of the water-bearing formation. Although the generated foam has a greater apparent viscosity than the first or second solutions, the foam is still operable to traverse into portions of the formation with greater permeability under motivation of pressure from the wellbore from which the solutions were introduced. As well, any free nitrogen gas generated from the reaction can create shear and therefore more foaming in other portions of the water-bearing formation.

Figure 2D:
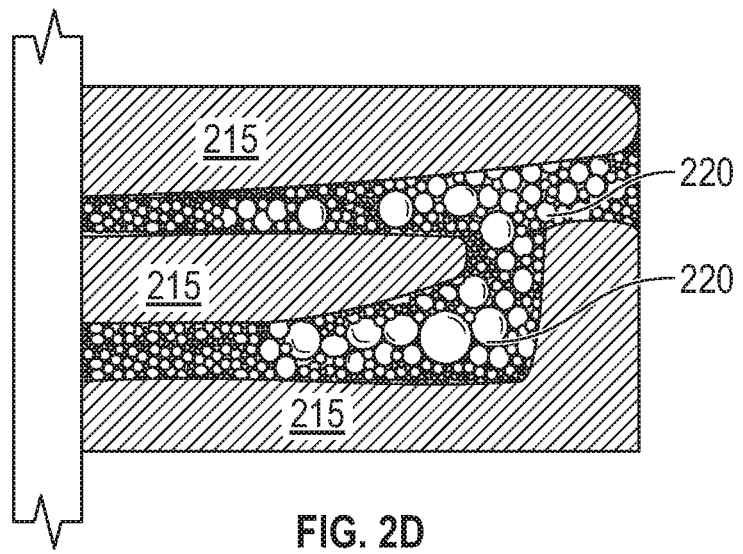

FIG. 2D shows the water-bearing formation 10 and that the foam 220 has formed in situ. Four factors at play in the formation generation of the foam: water, nitrogen gas, foaming agent, and shearing force. As the first solution and the second solution intermix and achieve favorable temperature or pH conditions for reaction, nitrogen gas is generated. As the now reacting, intermixed solution (generating both heat and fluid shear) moves through the formation (generating fluid shear), the foam forms and expands. The expansion of the foam creates more shear and pushes foam into the greater permeability area 210 of the water-bearing formation 10. The foam 220 occupies and spreads throughout the greater permeability area 210 (not shown) of the formation 10.

Figure 2E:
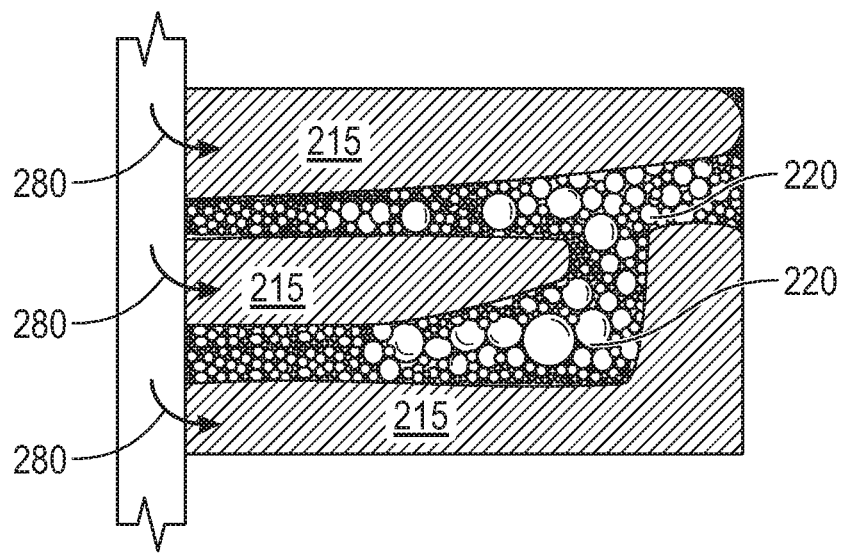

FIG. 2E shows an embodiment where after formation of the foam an aquifer remediation fluid is introduced (arrows 280) into the water-bearing formation 10. The foam 220 has an apparent viscosity. In such embodiments, the apparent viscosity of the aquifer remediation fluid is less than the apparent viscosity of the foam 220 in the formation 10. In many instances the apparent viscosity of the foam is much greater than the tat of the aquifer remediation fluid. In some embodiments, the apparent viscosity of the foam is at least 10 times greater than that of the aquifer remediation fluid at formation conditions. In certain embodiments, the apparent viscosity of the generated foam is at least 10 times, 15 times, 20 times, 30 times, 50 times, 100 times, to about 1000 times greater than the apparent viscosity of the aquifer remediation fluid at the water-bearing formation conditions, including all values, ranges and combinations therein between. Because of the difference in apparent viscosity, the aquifer remediation fluid preferentially migrates into formation 10 through the lower permeability areas 215 of the formation 10 versus attempting to push its way through the foam 220.

In some embodiments, the apparent viscosity of the foam at 60° C. is in a range of from about 10 cP to about 50 cP at a low shear rate, such as in a range of from about 10 to about 50 RPM.

The embodiment foam generated in-situ is stable in the formation at formation conditions. The foam half-life is the time required for a foam to lose half of its initial height at reservoir conditions. The foam may have a half-life in a range of a few hours, to 24 hours, to a week, to two weeks, to a month, to several months. In some embodiments, the foam has a foam half-life of at least about 24 hours. Such stability in the formation at formation conditions permits careful and planned introduction of the aquifer remediation fluid around the stable, viscous foam.

In some embodiments of the method, the aquifer remediation fluid is operable to chemically mitigate the dense non-aqueous phase liquid in the water-bearing formation. In some other embodiments, the aquifer remediation fluid is operable to physically mitigate the dense non-aqueous phase liquid in the water-bearing formation. Such physical mitigation may include sealing a portion of the water-bearing formation where DNAPLs are present to prevent future migration through the water-bearing formation.

Embodiments of the present disclosure may provide at least one of the following advantages. The first and second solutions can be introduced into areas of greater permeability and portions of the water-bearing formation that have been previously treated, such as sections of the water-bearing formation with less permeability but treated due to underride. "Underride" is known to occur with aqueous solutions having surfactants due to such solutions typically being typically greater in density than formation waters. This causes such treatments as they push further into the formation to drift downwards and into the lower parts of the formation. The formation of a reduced density yet viscous foam in the greater permeability portions of the formation permits later aquifer remediation fluid to treat and be diverted into areas of the formation where there is reduced permeability and where underride may have caused prior treatments to drift below and miss. The foam having a greater apparent viscosity than the later-introduced aquifer remediation fluid diverts the later aquifer remediation fluid away from areas that the foam occupies, which is the area of greater permeability that the first and second solutions were able to traverse. Even though the foam is not dense—it is predominantly made of nitrogen gas captured by bubbles of foaming agent with water—it is highly resilient. This resilience along with the apparent viscosity of the foam in the greater permeability regions is significant enough that the later-introduced aquifer remediation fluid is prevented from entering the areas where the foam resides. The later-introduced aquifer remediation fluid, facing strong physiochemical resistance from the foam, must traverse the formation through the non-foamed and reduced permeability sections of the formation. As well, the presence of the foam within the formation prevents gravity underride from occurring because the foam is already in those regions. This provides for a better sweep of the upper portions of the formation that although being more permeable may have been bypassed due to gravity underride. This is an additional advantage of the methods disclosed over the prior art treatment methods.

As used here and in the appended claims, the words "comprise," "has," and "include" and all grammatical variations thereof are each intended to have an open, non-limiting meaning that does not exclude additional elements or steps. The term "comprising," and derivatives thereof, is not intended to exclude the presence of any additional component, step or procedure, whether or not the same is disclosed. In order to avoid any doubt, all compositions claimed, through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Substantially equivalent" means that a first value is within +/−10%, or within +/−5%, or within +/−1%, or within +/−0.1%, or within +/−0.01%, or within +/−0.001% of a second value.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Where the specification and appended claims reference a method comprising two or more defined steps, the defined steps can be carried out in any order or simultaneously except where the context excludes that possibility.

As used, terms such as "first" and "second" are arbitrarily assigned and are merely intended to differentiate between two or more components of a system, an apparatus, or a composition. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the various embodiments described.

Although only a few example embodiments have been described in detail, those skilled in the art will readily appreciate that many modifications are possible in the example embodiments without materially departing from the disclosed scope as described. Accordingly, all such modifications are intended to be included within the scope of this disclosure as defined in the following claims. In the claims, means-plus-function clauses are intended to cover the structures described as performing the recited function and not only structural equivalents, but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6, for any limitations of any of the claims, except for those in which the claim expressly uses the words 'means for' together with an associated function.

What is claimed is:

1. A method for remediation of a water-bearing formation comprising the steps of:
   introducing a first aqueous solution and a second aqueous solution into the water-bearing formation such that the first aqueous solution and the second aqueous solution intermix within the water-bearing formation; and
   maintaining the intermixed solution in the water-bearing formation such that a foam is generated in situ;
   where the intermixed solution comprises a foaming agent;
   where the first aqueous solution comprises a nitrogen-containing compound and an acid;
   where the second aqueous solution comprises a nitrite-containing compound;
   where the concentration of the acid in the first aqueous solution is such that the pH of the intermixed solution in the water-bearing formation is at or less than about 4.5; and
   where the apparent viscosity of the foam generated in the water-bearing formation is in a range of from about 10 times to about 1000 times greater than an apparent viscosity of an aquifer remediation fluid as measured at 60° C. at a low shear rate in a range of from about 10 to about 50 RPM.

2. The method of claim 1 where the nitrogen-containing compound is selected from the group consisting of an ammonium-containing compound, a primary amine-containing compound, and combinations thereof.

3. The method of claim 2 where the ammonium-containing compound is selected from the group consisting of ammonium hydroxide, ammonium chloride, ammonium bromide, ammonium nitrate, ammonium nitrite, ammonium acetate, ammonium formate, ammonium sulfate, and ammonium carbonate.

4. The method of claim 2, where the primary amine-containing compound is selected from the group consisting of ethylene diamine, formamide, acetamide, urea, benzyl urea, butyl urea, hydrazine, phenylhydrazine, and phenylhydrazine hydro-chloride.

5. The method of claim 1 where the nitrite-containing compound is selected from the group consisting of ammonium nitrite, calcium nitrite, sodium nitrite, potassium nitrate, and combinations thereof.

6. The method of claim 1 where the first aqueous solution and the second aqueous solution are introduced into the formation separately.

7. The method of claim 6 where the first aqueous solution and the second aqueous solution are introduced into the formation simultaneously and separately.

8. The method of claim 1 where the first aqueous solution is introduced into the water-bearing formation at a temperature less than the temperature of the water-bearing formation.

9. The method of claim 1 where the second aqueous solution is introduced into the formation at a temperature less than the temperature of the water-bearing formation.

10. The method of claim 1, where the temperature in which the first aqueous solution is introduced is such that the temperature of the intermixed solution in the water-bearing formation is from about 60° C. to about 110° C.

11. The method of claim 1, where the temperature in which the second aqueous solution is introduced is such that the temperature of the intermixed solution in the water-bearing formation is from about 60° C. to about 110° C.

12. The method of claim 1 where a molar ratio of a concentration of the nitrogen-containing compound in the first aqueous solution and a concentration of the nitrite-containing compound in the second aqueous solution is in a range of about 1:1 to about 1:2.

13. The method of claim 1 where a volume ratio of the first aqueous solution to the second aqueous solution is about 1:1.

14. The method of claim 1, where the acid is selected from the group consisting of hydrochloric acid, citric acid, propionic acid, benzoic acid, formic acid, acetic acid, and combinations thereof.

15. The method of claim 1, where the first aqueous solution further comprises an acid buffer, and where the acid is hydrochloric acid.

16. The method of claim 1 where the foam quality of the foam generated in situ is in a range of from about 50% to about 99%.

17. The method of claim 1, further comprising introducing the aquifer remediation fluid into the water-bearing formation after the generation of the foam.

* * * * *